(12) United States Patent
Cook

(10) Patent No.: US 7,573,165 B2
(45) Date of Patent: Aug. 11, 2009

(54) COMPRESSOR AND DRIVING MOTOR ASSEMBLY

(75) Inventor: Roger Cook, Warrington (GB)

(73) Assignee: Ingersoll-Rand European Sales Limited, Bolton (GB)

( * ) Notice: Subject to any disclaimer, the term of this patent is extended or adjusted under 35 U.S.C. 154(b) by 439 days.

(21) Appl. No.: 11/223,763

(22) Filed: Sep. 9, 2005

(65) Prior Publication Data

US 2006/0056996 A1 Mar. 16, 2006

Related U.S. Application Data

(63) Continuation of application No. 09/995,052, filed on Nov. 27, 2001, now abandoned.

(30) Foreign Application Priority Data

Dec. 21, 2000 (GB) ................................. 0031188.6

(51) Int. Cl.
 *H02K 5/00* (2006.01)
(52) U.S. Cl. .......................................... 310/90; 310/91
(58) Field of Classification Search .................. 310/91, 310/90, 89; 417/421, 372, 360
 See application file for complete search history.

(56) References Cited

U.S. PATENT DOCUMENTS

| | | | |
|---|---|---|---|
| 2,305,125 A * | 12/1942 | Wolferz | 310/156.14 |
| 2,493,102 A * | 1/1950 | Brainard | 310/156.78 |
| 3,391,291 A * | 7/1968 | O'Neil et al. | 310/90 |
| 3,694,661 A * | 9/1972 | Minowa | 290/1 R |
| 3,848,422 A | 11/1974 | Schibbye | |
| 3,922,114 A | 11/1975 | Hamilton et al. | |
| 4,079,278 A | 3/1978 | Luneau | |
| 4,079,287 A | 3/1978 | Soules et al. | |
| 4,286,187 A * | 8/1981 | Binder | 310/91 |
| 4,473,752 A * | 9/1984 | Cronin | 290/38 R |
| 4,514,991 A | 5/1985 | Zinsmeyer | |
| 4,547,135 A | 10/1985 | Noel et al. | |
| 5,096,389 A | 3/1992 | Grady | |
| 5,216,308 A | 6/1993 | Meeks | |
| 5,217,359 A | 6/1993 | Kawahara et al. | |
| 5,222,874 A | 6/1993 | Unnewehr et al. | |
| 5,246,349 A | 9/1993 | Hartog | |
| 5,302,300 A | 4/1994 | Porri | |
| 5,382,833 A | 1/1995 | Wirges | |
| 5,413,467 A | 5/1995 | Suzuki | |
| 5,686,699 A | 11/1997 | Chu et al. | |
| 5,807,091 A * | 9/1998 | Shaw | 418/152 |
| 5,846,062 A | 12/1998 | Yanagisawa et al. | |
| 5,904,473 A | 5/1999 | Dahmlos et al. | |
| 5,912,516 A | 6/1999 | Atkinson et al. | |
| 5,924,855 A | 7/1999 | Dahmlos et al. | |
| 5,947,854 A | 9/1999 | Kopko | |

(Continued)

FOREIGN PATENT DOCUMENTS

DE 1476993 5/1971

(Continued)

*Primary Examiner*—Dang D Le
(74) *Attorney, Agent, or Firm*—Michael Best & Friedrich LLP

(57) ABSTRACT

In a compressor and driving motor assembly, the driving motor is a hybrid permanent magnet motor and/or has a rotor mounted directly on the drive shaft of the compressor, the drive shaft acting as a cantilever supporting the rotor.

16 Claims, 3 Drawing Sheets

U.S. PATENT DOCUMENTS

| | | |
|---|---|---|
| 6,003,324 A | 12/1999 | Shaw |
| 6,045,344 A | 4/2000 | Tsuboi et al. |
| 6,419,465 B1 | 7/2002 | Goettel et al. |
| 6,447,267 B1 | 9/2002 | Varney et al. |
| 6,450,777 B2 | 9/2002 | Lynn et al. |
| 2002/0081227 A1 | 6/2002 | Pellicano et al. |

FOREIGN PATENT DOCUMENTS

| | | |
|---|---|---|
| DE | 124 453 | 2/1997 |
| EP | 0 811 766 A2 | 12/1997 |
| EP | 1 041 289 A2 | 10/2000 |
| EP | 1 075 074 A2 | 2/2001 |
| EP | 1 041 289 A3 | 1/2002 |
| EP | 1 207 307 A1 | 5/2002 |
| EP | 1 075 074 A3 | 7/2003 |
| FR | 1.538.595 | 9/1968 |
| FR | 1.566.037 | 5/1969 |
| JP | 05223083 | 8/1993 |
| JP | 9-324780 | 12/1997 |
| WO | WO 02/101244 A1 | 12/2002 |

\* cited by examiner

COMPRESSOR AND DRIVING MOTOR ASSEMBLY

RELATED APPLICATION DATA

This is a continuation patent application of co-pending U.S. patent application Ser. No. 09/995,052 filed on Nov. 27, 2001, and United Kingdom Patent Application Ser. No. 0031188.6 filed on Dec. 21, 2000, the contents of which are incorporated herein by reference.

FIELD OF THE INVENTION

The present invention relates to a compressor and driving motor assembly.

BACKGROUND OF THE INVENTION

Traditional methods of driving compressors using conventional electric motors include not only direct drive connections, but also intermediate couplings, belts, pulleys and gears. In the simplest known form there is direct drive with the motor rotor joined directly onto the input shaft of a compressor. Such a known compressor and motor assembly is shown in FIG. 1. It includes a rotary screw air compressor 1 having bearings 7, and an extended male input shaft 2 which is connected to the rotor 3 of the motor 4. Even in this simplest form the shear weight of the rotor requires the rotor 3 and input shaft 2 to be supported on additional bearings 5.

Various types of motors are known to be used to drive compressors. For example, fixed speed drive motors known to be used to drive rotary screw air compressors, whether flooded or oil free, have involved induction motors linked to various mechanisms of air flow rate control, such as automatic start and stop and more sophisticated inlet controls which limit flow rate in response to variation in system pressure.

Variable speed drive motors are also known for use with compressors such as rotary screw air compressors. These include mechanical speed variation motors, variable speed induction motors (VFD), and variable speed switched reluctance motors (SRD).

Although motors with mechanical speed variation have been tried in limited air compressor applications, these suffer disadvantages of underlying complexity, questionable reliability and overall poor efficiency.

Variable speed induction motors driven by variable frequency inverters are used more widely. The disadvantages are that there are losses in efficiency due to the electronics involved and limitations imposed by the induction motor itself. Although enhanced in most cases with improved insulation, the induction motor can still be nevertheless a compromise from the reliability and efficiency standpoint.

In addition, variable frequency induction motors even if modified to withstand the rigours of variable frequency inverter drive are large and intrinsically heavy units. All the compressor products on the market today using VFD drive systems are a development of existing compressor packaging technologies due to the physical constraints imposed by the use of the induction motors. In all these cases the motors which drive the compressors are usually without gears but with adapter housings, couplings, etc. due to the sizes and masses of the motors involved. Additionally, due to the method of construction and the size of the motor windings, rotor assembly, etc., conventional motor construction involving heavy castings, bearings, end shields, couplings, adapter housings and other relatively expensive components are required.

Compressors are also known involving switch reluctance main drive motors and suitably modified variable frequency inverter drives (SRD), however these also have similar disadvantages.

As a separate matter, hybrid permanent magnet motors are, in themselves, known. In these, magnetic flux to drive the rotor is produced by both permanent magnets and current flow in electromagnetic coils. Examples are described in, for example, U.S. patents U.S. Pat. No. 4,079,278 and U.S. Pat. No. 4,830,412, United Kingdom patent application GB-A-2291274 and European patent EP-A-0780954.

SUMMARY OF THE INVENTION

The present invention in its first aspect provides a compressor and driving motor assembly, in which the motor comprises a rotor and a stator assembly, and the compressor comprises a main body which supports a drive shaft, the rotor being mounted directly on the drive shaft, in which the drive shaft acts as a cantilever supporting the rotor.

In its preferred embodiments, there is thus provided a 'pancake' style motor in the assembly. Support bearing(s) at a distance from the compressor are not required and so are preferably not provided. The direct connection of rotor to drive shaft avoids the need for additional connection means such as couplings, bearings, gears and belts, which would give rise to energy losses, increased complexity and cost, and risks of these components being unreliable. The compressor includes bearings, the loads on which are acceptable in fully supporting the rotor. Preferred embodiments are small and compact and simple in construction and ease of assembly, and are low maintenance.

The rotor is preferably shaped so as to have a tapered central longitudinal aperture adapted to fit to a correspondingly tapered portion of the drive shift. The drive shaft preferably includes releasable retaining means operative to secure the rotor once fitted on the drive shaft.

The stator assembly is preferably connected to the housing of the compressor. This connection is preferably directly to the housing or by way of an adapter flange.

The compressor is preferably an air compressor. The compressor is preferably a rotary screw compressor.

The present invention in its second aspect provides a compressor and driving motor assembly, the driving motor being a hybrid permanent magnet motor.

The present invention in its preferred embodiments advantageously provides a compressor assembly having a smaller and lighter motor than earlier known assemblies involving, for example, induction or SRD-type drive motors. Advantageously the motor is sufficiently small and light that no support bearing at a distance from the compressor is required to support the motor.

The motor is preferably mounted directly to the compressor. The rotor of the motor is preferably mounted directly on the shaft of the compressor (so as to provide direct drive). The housing of the motor is directly connected to the compressor housing or to a support plate connected to the compressor housing.

The compressor is preferably an air compressor. The compressor is preferably a rotary screw compressor.

The motor can be a fixed speed motor or can be a variable speed motor.

The rotary screw air compressor can be of flooded type or can be of the oil-free type.

The preferred assembly is small, compact, technically simple, efficient and reliable.

BRIEF DESCRIPTION OF THE DRAWINGS

Preferred embodiments of the present invention will now be described by way of example and with reference to the drawings in which.

DETAILED DESCRIPTION OF THE PREFERRED EMBODIMENT

The Assembly

Figure 1:
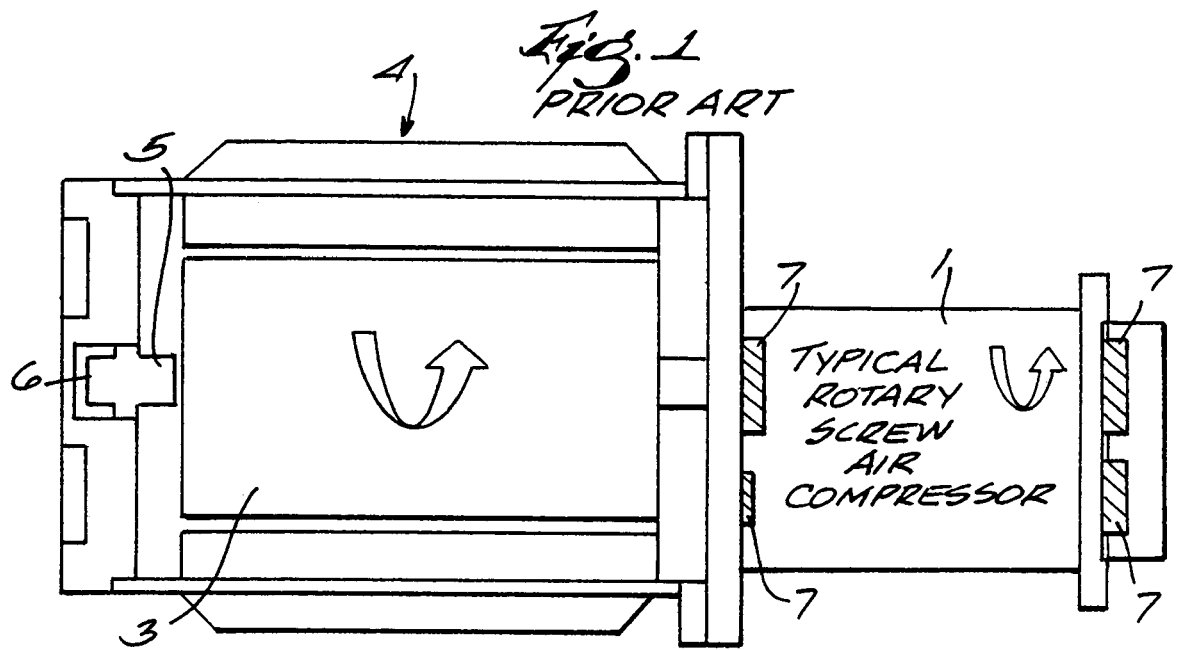
FIG. 1 is a diagrammatic sectional view of a prior art air compressor and motor assembly.
Figure 2:
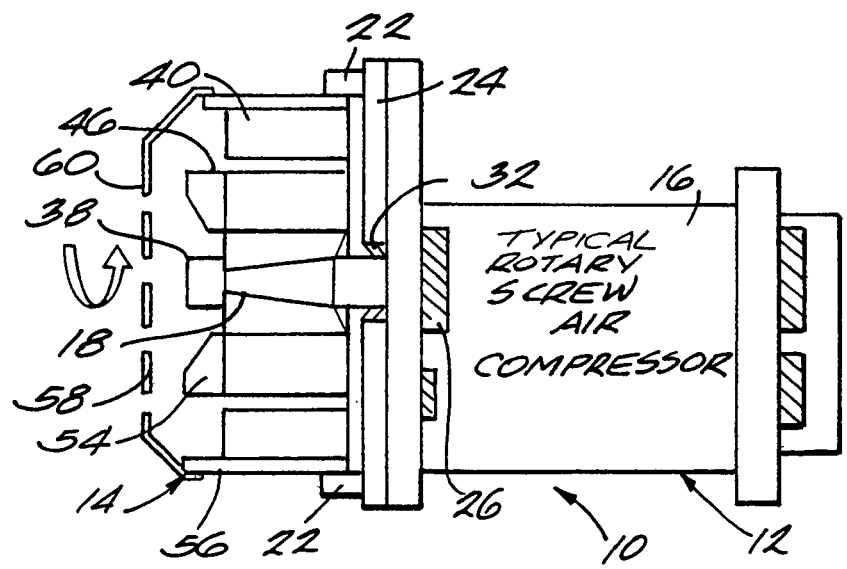
FIG. 2 is a diagrammatic section view for comparison with FIG. 1 of a preferred air compressor and motor assembly according to the invention.
Figure 3:
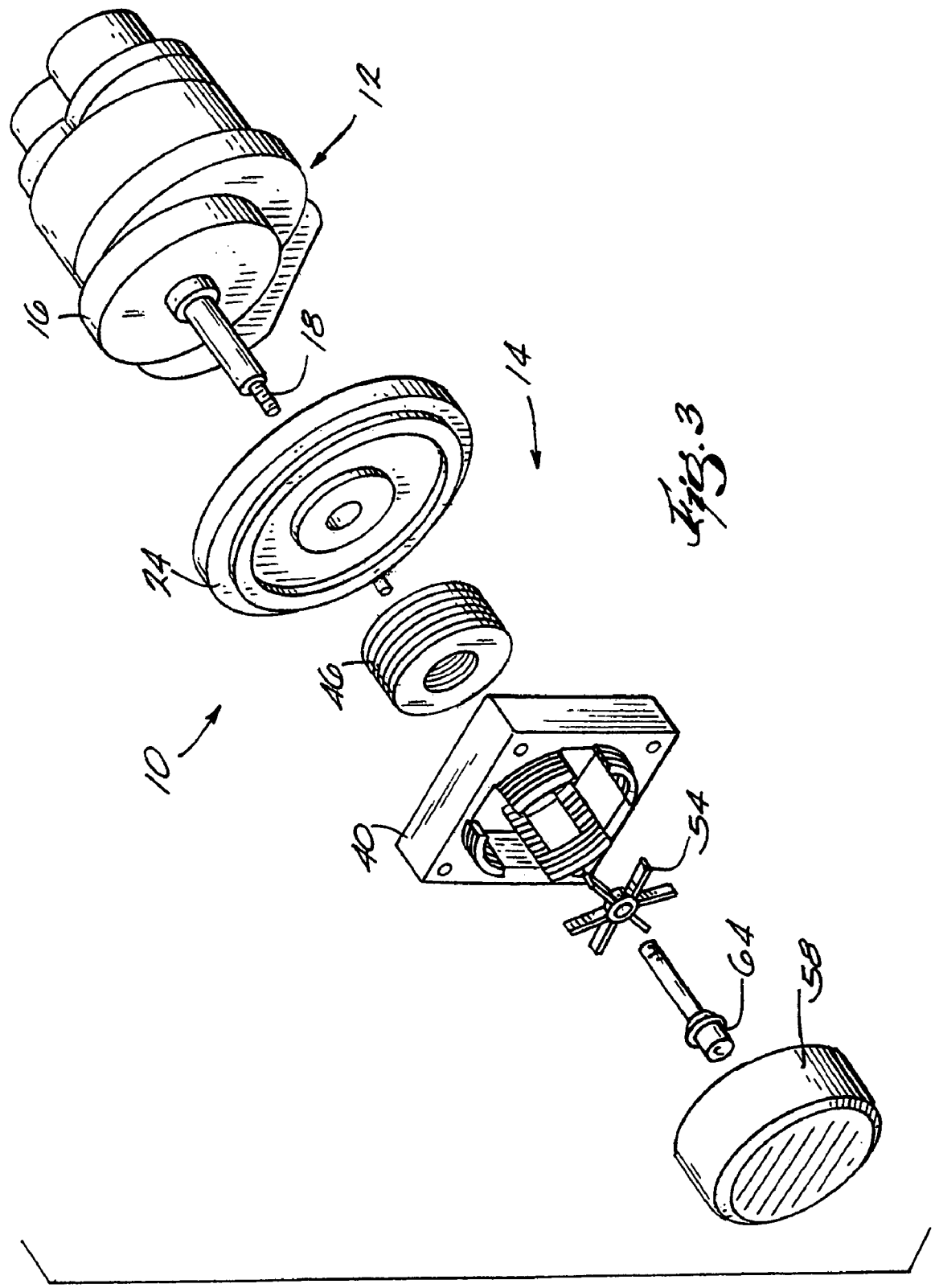
FIG. 3 is an exploded perspective view of the air compressor and motor assembly shown in FIG. 2.
Figure 4:
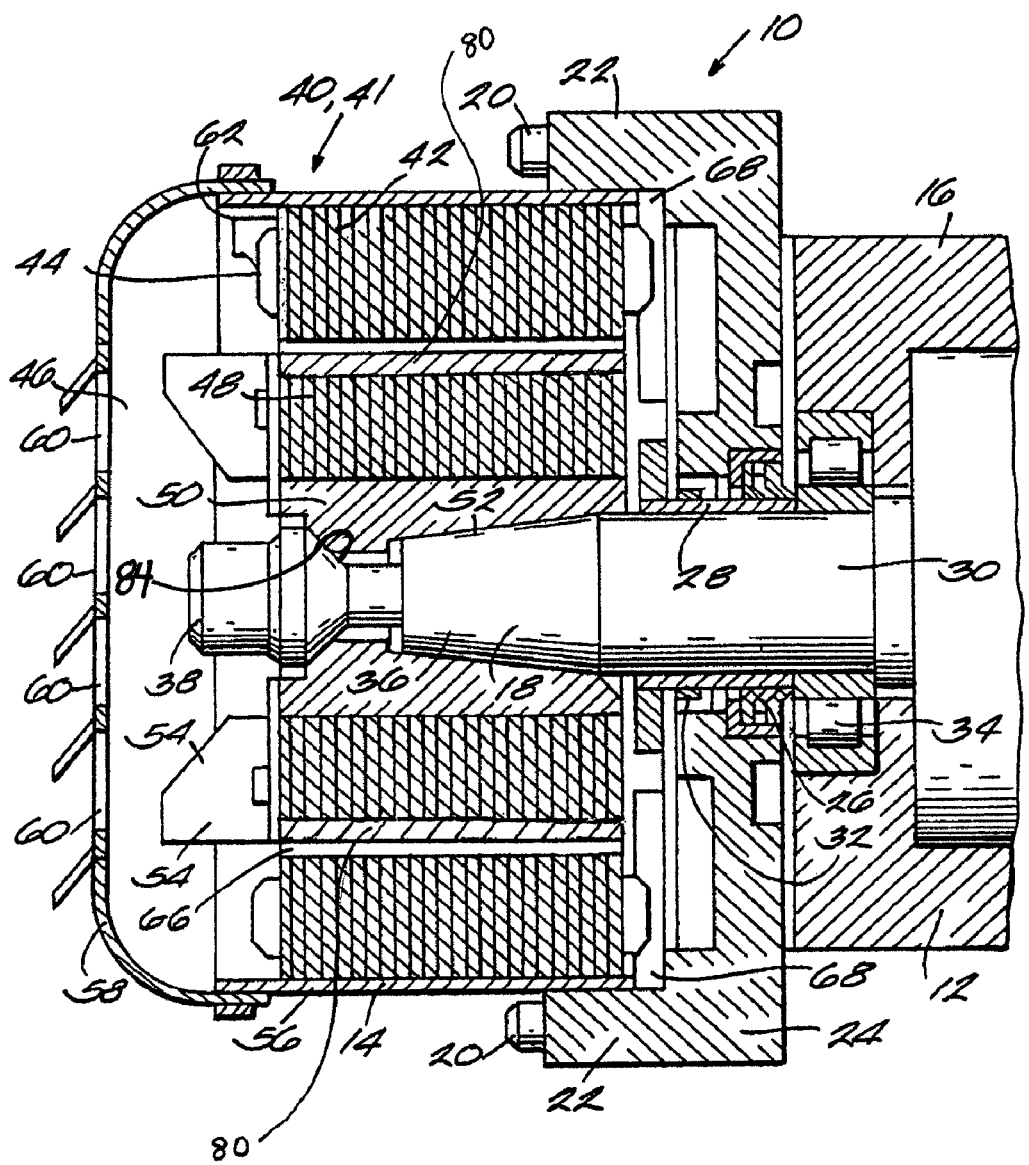
FIG. 4 is a more detailed sectional view of a portion of the air compressor and motor assembly shown in FIGS. 2 and 3.

As shown in FIGS. 2 to 4, the preferred compressor and motor assembly 10 consists of a rotary screw air compressor 12 and a motor 14.

The Rotary Screw Air Compressor 12

The rotary screw air compressor 12 (also known as an airend) includes a housing 16 from which extends a shaft 18 (known as an airend input shaft) in use driven to rotate by the motor 14.

The motor 14 is located by a spigot (not shown) and attached by bolts 20 entered through mounting blocks 22 to an adapter flange 24 of the compressor 12 connected to the housing 16 of compressor 12. The adapter flange 24 includes a main shaft seal 26 configured to cooperate with a shaft seal wear sleeve 28 around a cylindrical portion 30 of the shaft 18. The adapter flange 24 also includes a shaft dust seal 32 which also cooperates with the sleeve 28. The compressor 12 includes an input shaft bearing 34 within its housing 16.

The shaft 18 has a frustoconical i.e. tapered end portion 36 having a threaded end aperture (not shown) configured to receive a retention bolt 38.

The Motor

The motor 14 is a hybrid permanent magnet (HPM) motor 41. It consists of a stator 40 including stator laminations 42 and stator coils 44. The rotor laminations 48 mounted on an apertured rotor shaft 50, the aperture 52 of which is of tapered shape to fit the end portion 36 of the shaft 18 of the compressor 12. The rotor shaft 50 is secured to the shaft 18 of the compressor 12 by retention bolt 38, which includes a frustoconical (i.e. tapered) end portion 84.

The motor 14 has a motor-cooling fan 54 attached to the rotor 40. The motor 14 has a casing 56 which includes a fan cowling 58. The fan cowling 58 has air inlet apertures 60.

As shown in FIG. 4, the motor 14 includes at least one rotor positioning sensor 62 or as shown in FIG. 3 optionally includes an encoder 64 (i.e. shaft positioning device).

There is an air gap 66 between the rotor 46 and stator 40. There are cooling air exits 68 from the motor casing 56 located at a distance from the inlets 60. There are a plurality of magnets 80 positioned around the rotor laminations 48 in one arrangement. Other arrangements of permanent magnets are also known. As such, the present invention is not limited to the specific arrangement of permanent magnets 80 illustrated herein.

Drive Connection of Motor to Compressor

As can be seen in FIG. 4, the rotor 46 is mounted directly on to the shaft 18 of the air compressor 12 using a simple tapered fit. This is possible due to the low size and weight of the hybrid permanent magnet motor.

The rotor 46 is secured using a single retention bolt 38 with the compressor fluid and or the compressed air retained within the compressor itself by a conventional lip sealing arrangement (main seal 26) backed up with a single-lip dust seal 32.

The stator is then mounted over the rotor located by a spigot feature and retained using mounting blocks 22 and bolts 20. A simple fan cowl 58 to effect the cooling of the motor is provided, however in other embodiments this open drip proof design of cowl in accordance with International Electrical Committee IEC 34-5 Protection Standard No. IP23 is replaced by a totally enclosed cowl in accordance with International Electrical Committee IEC 34-5 Protection Standard IP54 protection.

Some benefits of the preferred direct i.e. cantilever arrangement of mounting the rotor of the motor to the drive shaft of the compressor can be listed as follows:
Reduced assembly time
Reduced cost
Reduced inventory
Reduced dimension
Reduced weight
Reduced transmission power loss
Improved handling
No gears
No lubrication (motor)
No bearings
No seals in the motor
No alignment procedures
No or greatly reduced maintenance
Significantly increased reliability
Significantly reduced product variants
Voltage and frequency variations accommodated by one design In some other embodiments of the invention, the compressor is a gas compressor where the gas is other than air, or a refrigerant compressor. In some other embodiments, the compressor is of reciprocating i.e. piston-type, or rotary type, or any other type having internal rotating elements.

We claim:

1. A compressor and driving motor assembly, in which the motor is a hybrid permanent magnet motor and comprises a rotor and a stator assembly, the compressor comprising a main body supporting first and second interengaged compressor rotors; and a substantially horizontal drive shaft having first and second portions, wherein one of the first and second compressor rotors is mounted on the drive shaft first portion and the motor rotor is mounted directly on the drive shaft second portion, the drive shaft first portion being vertically supported by the compressor main body and the drive shaft second portion is free of vertical support to provide cantilever support of the motor rotor, wherein the drive shaft second portion includes a first frustoconical tapered portion tapered in a first direction and a second frustoconical tapered portion tapered in a second direction opposite the first direction, the motor rotor being mounted on the first frustoconical tapered portion by tapered fit, the first tapered portion and the second tapered portion cooperating to inhibit axial movement of the motor rotor on the drive shaft, and wherein the drive shaft drives the compressor rotor mounted thereon and the interengagement between the first and second compressor rotors drives the other compressor rotor.

2. An assembly according to claim 1, in which the motor rotor is shaped so as to have a central longitudinal aperture configured to fit to the first frustoconical tapered portion of the drive shaft second portion.

3. An assembly according to claim 1, in which the compressor has a housing, and the stator assembly is connected to the housing of the compressor.

4. An assembly according to claim 3, in which the stator assembly is directly connected to the housing.

5. An assembly according to claim 3, in which the stator assembly is connected to the housing by way of an adapter flange.

6. The assembly according to claim 1, wherein the hybrid permanent magnet motor provides an induction mode and a permanent magnet mode.

7. An assembly according to claim 1, in which the compressor is a rotary screw air compressor.

8. An assembly according to claim 1, in which the motor is a fixed speed motor.

9. An assembly according to claim 1, in which the motor is a variable speed motor.

10. An assembly according to claim 1, in which the compressor is of oil-flooded type.

11. An assembly according to claim 1, in which the compressor is of oil-free type.

12. An assembly according to claim 1, in which the motor comprises a rotor which is mounted directly on to a drive shaft of the compressor.

13. An assembly according to claim 1, wherein the second tapered frustoconical portion is formed on a separate piece from the first taperered frustoconical portion, the separate piece threadably engageable with the drive shaft.

14. An assembly according to claim 1, wherein the separate piece is threaded along the centerline of the drive shaft.

15. A compressor and driving motor assembly comprising:
a stator arranged to define a stator opening;
a rotor including a portion disposed within the stator opening;
a compressor main body;
a first compressor rotor;
a second compressor rotor engaged with the first compressor rotor, the first compressor rotor and the second compressor rotor supported by the compressor main body;
a drive shaft having a first portion that supports the first compressor rotor and a second portion that includes a frustoconical tapered portion having a large diameter end proximate to the first compressor rotor and a small diameter portion distal from the first compressor rotor, the rotor engaged with and supported by the frustoconical portion;
a bearing positioned to support the drive shaft such that the second portion is supported in a cantilever fashion; and
a retention bolt coupled to the drive shaft adjacent the small diameter end and engaged with the rotor to inhibit axial movement of the rotor in a direction away from the first compressor rotor, wherein the retention bolt includes a second frustoconical portion that engages the rotor.

16. An assembly according to claim 15, wherein the retention bolt is directly threaded to the drive shaft.

* * * * *

UNITED STATES PATENT AND TRADEMARK OFFICE
CERTIFICATE OF CORRECTION

PATENT NO. : 7,573,165 B2  
APPLICATION NO. : 11/223763  
DATED : August 11, 2009  
INVENTOR(S) : Roger Cook Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 542 days.

Signed and Sealed this

Seventh Day of September, 2010

David J. Kappos  
*Director of the United States Patent and Trademark Office*